US008255824B2

(12) United States Patent
Selig

(10) Patent No.: US 8,255,824 B2
(45) Date of Patent: Aug. 28, 2012

(54) TOOLBAR/SIDEBAR BROWSER EXTENSION

(75) Inventor: Roy A. Selig, Princeton, NJ (US)

(73) Assignee: Oracle International Corporation, Redwood Shores, CA (US)

(\*) Notice: Subject to any disclaimer, the term of this patent is extended or adjusted under 35 U.S.C. 154(b) by 887 days.

(21) Appl. No.: 11/978,921

(22) Filed: Oct. 30, 2007

(65) Prior Publication Data

US 2008/0184159 A1    Jul. 31, 2008

Related U.S. Application Data

(60) Provisional application No. 60/898,294, filed on Jan. 30, 2007.

(51) Int. Cl.
G06F 3/048    (2006.01)
(52) U.S. Cl. .................. 715/781; 715/779
(58) Field of Classification Search ............ 712/32; 707/100; 715/779; 705/14
See application file for complete search history.

(56) References Cited

U.S. PATENT DOCUMENTS

| | | | |
|---|---|---|---|
| 5,390,295 A * | 2/1995 | Bates et al. .................. 715/789 |
| 6,272,493 B1 | 8/2001 | Pasquall |
| 6,321,209 B1 | 11/2001 | Pasquall |
| 6,434,563 B1 | 8/2002 | Pasquali et al. |
| 6,535,882 B2 | 3/2003 | Pasquali |
| 6,636,856 B2 | 10/2003 | Pasquall |
| 6,658,419 B2 | 12/2003 | Pasquall |
| 6,918,066 B2 | 7/2005 | Dutta et al. |
| 7,085,736 B2 | 8/2006 | Keezer et al. |
| 7,089,237 B2 * | 8/2006 | Turnbull et al. .................. 1/1 |
| 7,107,264 B2 | 9/2006 | Lu |
| 7,171,384 B1 * | 1/2007 | Fitzpatrick et al. .......... 705/36 R |
| 2004/0041835 A1 * | 3/2004 | Lu .................................. 345/748 |
| 2004/0165007 A1 | 8/2004 | Shafron |
| 2004/0205633 A1 | 10/2004 | Martinez et al. |
| 2004/0212640 A1 * | 10/2004 | Mann et al. .................... 345/792 |
| 2005/0039144 A1 | 2/2005 | Wada et al. |
| 2005/0050301 A1 * | 3/2005 | Whittle et al. .................... 712/32 |
| 2005/0227216 A1 * | 10/2005 | Gupta ............................ 434/322 |
| 2006/0059434 A1 | 3/2006 | Boss et al. |
| 2006/0069617 A1 | 3/2006 | Milener et al. |
| 2006/0143568 A1 | 6/2006 | Milener et al. |
| 2006/0179404 A1 | 8/2006 | Yolleck et al. |
| 2006/0184578 A1 | 8/2006 | La Rotonda et al. |
| 2006/0184997 A1 | 8/2006 | La Rotonda et al. |
| 2006/0224951 A1 | 10/2006 | Burke et al. |
| 2007/0074126 A1 * | 3/2007 | Fisher et al. .................. 715/764 |

(Continued)

OTHER PUBLICATIONS

Wikipedia; Dashboard (software); www.en.wikipedia.com; Apr. 29, 2005; pp. 1-7.

(Continued)

Primary Examiner — Tuyetlien Tran
Assistant Examiner — Peiyong Weng
(74) Attorney, Agent, or Firm — Kraguljac Law Group, LLC

(57) ABSTRACT

Methods and other embodiments associated with a web browser extension are described. One example browser extension includes a toolbar logic to provide a toolbar. The toolbar may include, for example, a set of graphical user interface elements displayed in connection with a browser window. The browser extension may also include a sidebar logic to provide a sidebar. The browser extension may also include a coordination logic to coordinate the presentation and functionality of a combination of the toolbar and the sidebar to be provided to a browser. The presentation and functionality may be based, at least in part, on a selectable presentation mode and a selectable attachment mode.

24 Claims, 16 Drawing Sheets

U.S. PATENT DOCUMENTS

2007/0101298 A1   5/2007   Yolleck et al.
2008/0005282 A1*  1/2008   Gaedcke ................ 709/219

OTHER PUBLICATIONS

Wikipedia; Windows Sidebar; www.en.wikipedia.org; Nov. 8, 2006; pp. 1-3.
King, Brian; What is Firefox, Published on O'Reilly Network; http://www.oreillynet.com; Sep. 26, 2005; pp. 1-7.
Xulplanet; Xul Tutorial, Ch. 4.5: Content Panels (pp. 1-3) www.xulplanet.com/tutorials/xultu; Feb. 19, 2006.
Microsoft Corp.; Browse, Shop & Search Multiple Websites at Once; http://www.microsoft.com/windows/ie/ie7/tour/fre/tabs/how.html; Apr. 2007; p. 1.
Microsoft Corp.; Windows Help and How-To; Windows Vista Help: Using Quick Tabs in Internet Explorer; http://windowshelp.microsoft.com/04/2007; p. 1-2.

* cited by examiner

TOOLBAR/SIDEBAR BROWSER EXTENSION

CROSS REFERENCE TO RELATED APPLICATIONS

This application claims the benefit of U.S. Provisional Application Ser. No. 60/898,294 filed Jan. 30, 2007, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional web browsers may have provided a suboptimal experience for some enterprise applications with respect to how, when, and where content in toolbars and/or sidebars was displayed and/or arranged. Limitations associated with this type of management may have lead to issues with intelligent use of available display real estate. This real estate may have been better employed in displaying output associated with an enterprise application than with standard browser functionality. An enterprise application may include software hosted on an application server that provides services to users belonging to an enterprise. These users may have an enhanced enterprise application experience by interacting with specific browser chrome and/or specific enterprise application content in specific ways. However, a conventional web browser may have required applications, including enterprise applications, to deliver content and functionality in a browser window using only certain techniques (e.g., hypertext markup language (HTML)), and may also have controlled the nature, quantity, and location of available chrome. While providing an open, generic, global approach to content delivery and chrome management, this requirement may have limited the richness of possible interactions between web browsers and enterprise applications.

A web browser extension is a code package that can be installed into a browser and/or client device (e.g., computer) running a browser. The extension may add a new feature to a browser, extend an existing functionality, modify a visual theme, and so on. This browser may employ an extensible markup language (XML) user-interface language (XUL, pronounced zuul) to describe and support application user interfaces. XUL provides an overlay functionality that facilitates merging user interfaces from different sources into one user interface (UI). For example, UI from a browser and a browser extension(s) may be merged. Recall that a browser extension may provide additional functionality for a browser. This functionality may include, for example, additional UI features that facilitate customizing a browser UI.

The collective UI adornment for a browser (e.g., border, menus, frames, buttons, scrollbars) may be referred to as "browser chrome" or just "chrome". A browser extension may interact with the browser chrome. A browser extension may include a XUL file(s), JavaScript, a style sheet(s), an image(s), and so on. This set of items may be loaded into a single package (e.g., Zip file). The package may be loaded into, unwrapped by, and installed on a client device associated with a browser. Once installed, package components may be operably connected to a browser and/or browser object(s) using the XUL overlay feature. Though added to a browser, browser extension code may remain separate and removable. An extension may reside in a browser and/or client device rather than being part of a web page transmitted by a web service (e.g., enterprise application) to the browser and/or client. Thus, conventional systems may employ functionality (e.g., XUL) to facilitate enhancing web browsers via web browser extensions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
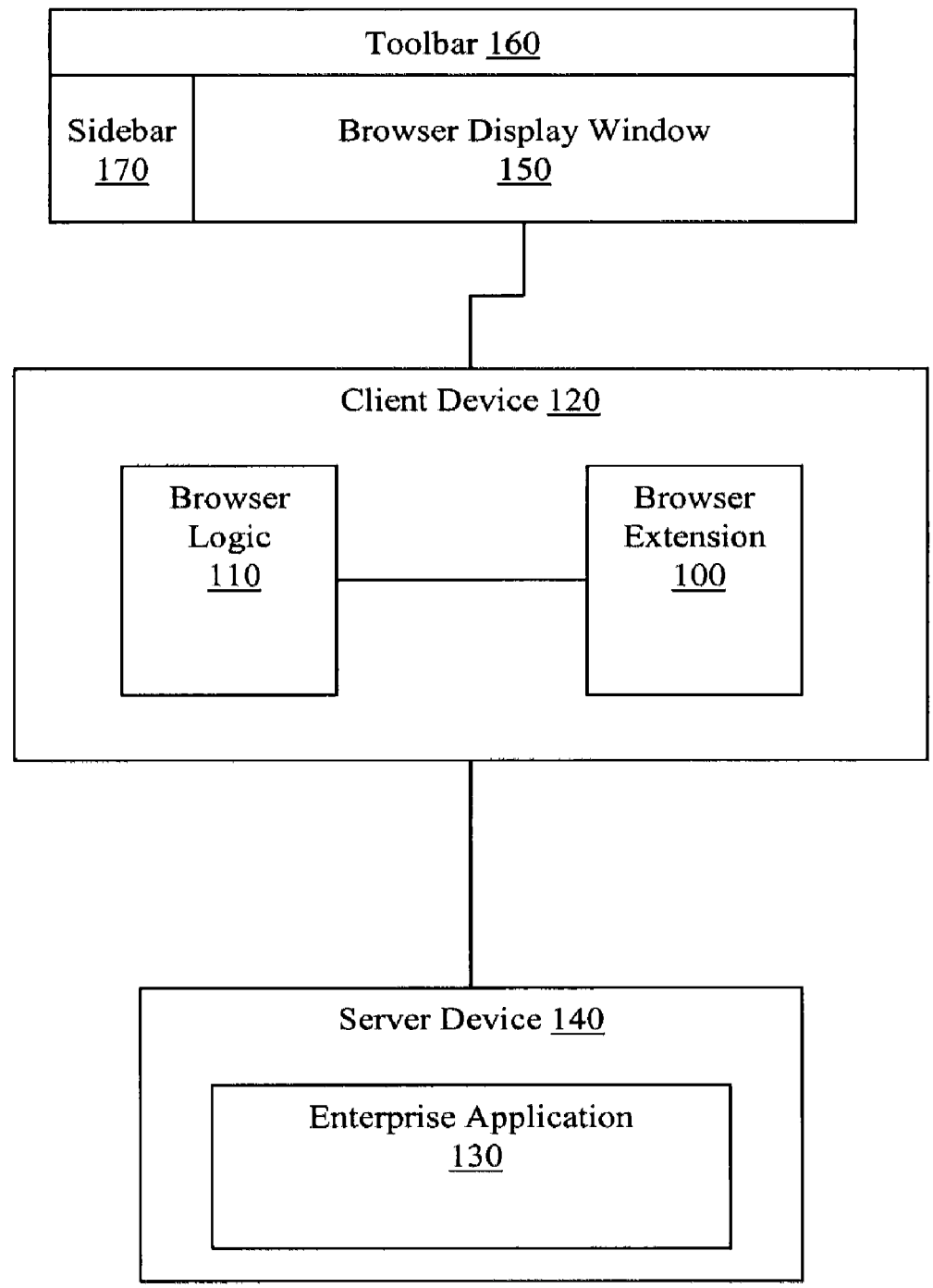
FIG. 1 illustrates a browser display window with an associated toolbar and sidebar being managed by a browser extension interacting with a browser logic.

In one embodiment, a browser extension provides a multi-mode (e.g., polymorphic) user interface (UI) including a combination toolbar/sidebar. The browser extension may be embodied as software and delivered as part of an Enterprise Web Browser Extension or as part of a separate toolbar/sidebar extension. Once installed on a client device, the browser extension may logically and/or physically become part of a browser and thus the multi-mode UI functionality may become part of the browser functionality. The multi-mode toolbar/sidebar extension may display and operate (e.g., control) a toolbar/sidebar combination associated with a web browser in a number of selectable modes. The selectable modes may include a dedicated mode, floating and embedded modes, combinations of horizontal and vertical modes, a hidden mode, and so on. A user may select a mode using an access point (e.g., bookmark, menu item, option panel). The mode may be remembered between sessions and may be automatically applied to related windows that are subsequently displayed. In one example, a toolbar may provide temporary visual access to data present in a hidden sidebar.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software in execution, and/or a combination thereof. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device can read.

"Logic", as used herein, includes but is not limited to hardware, firmware, software in execution, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms (e.g., routines, modules, methods, threads, programs) including separate applications or code from libraries (e.g., dynamically linked library (DLL)). Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated that computer-readable and/or executable instructions can be located in one logic and/or distributed between two or more communicating, co-operating, and/or parallel processing logics and thus may be loaded and/or executed in serial, parallel, massively parallel and other manners.

"User", as used herein, includes but is not limited to one or more persons, software components, computers or other devices, or combinations of these.

FIG. 1 illustrates a browser extension 100 interacting with a browser logic 110 running on a client device 120. The client device 120 may interact with a server device 140 running an enterprise application 130. The client device 120 may display output produced by the browser logic 110 and/or by the browser extension 100 in a browser display window 150. The browser display window 150 may interact with a toolbar 160 and a sidebar 170. Conventionally, toolbars and sidebars may have been independent things between which little, if any, cooperation existed. Browser extension 100 may manage toolbar 160 and sidebar 170 collectively to create a polymorphic toolbar/sidebar (PTS) combination. This PTS combination may be presented in different modes to provide synergies not present in conventional independent systems.

Client device 120 may include a browser logic 110 that provides a base amount of browser functionality. Client device 120 may also include a browser extension 100 to provide additional functionality to browser logic 110. While browser extension 100 is illustrated separate from browser logic 110, it is to be appreciated that these logics may, in some examples, reside in a single logic. Output from the browser logic 110 and the browser extension 100 may be merged onto the browser display window 150. Additionally, toolbar 160 and sidebar 170 may be collectively managed to facilitate intelligent use of available display real estate associated with browser display window 150.

Toolbar 160 may display, for example, buttons that control the operation of browser logic 110 and/or of enterprise application 130. These buttons may be associated with generic actions including, for example, starting an application, terminating an application, opening a file, formatting some data, moving data (e.g., cut/paste) and so on. However, these buttons may also be associated with actions specific to enterprise application 130. The specific actions would be related to the specific functionality provided by enterprise application 130. Sidebar 170 may display, for example, data associated with browser logic 110 and/or enterprise application 130. The data may include generic data including, for example, an application name, a window name, time of day, and other information. However, the data may also include data specific to enterprise application 130. This data may be arranged collectively and/or separated into different window panes. Since toolbar 160 and sidebar 170 may both display information specific to enterprise application 130, browser extension 100 may collectively manage toolbar 160 and sidebar 170 to establish and maintain relationships between related information. For example, a first button on toolbar 160 may control whether certain application specific data is displayed in sidebar 170 and a second button on toolbar 160 may control the appearance of that data on sidebar 170. A third button on toolbar 160 may be used to force an update of application specific data displayed on sidebar 170 while a fourth button may allow a user to cycle through application specific data displayed on sidebar 170. While four buttons and four actions are described, it is to be appreciated that a greater and/or lesser number of UI elements may be employed to provide a greater and/or lesser number of various actions associated with interactions between toolbar 160, sidebar 170, and enterprise application 130.

Not all users will interact with an enterprise application 130 in the same way. Additionally, not all enterprise applications will be suited to being interacted with in the same way. Therefore browser extension 100 may provide different modes for displaying toolbar 160 and sidebar 170. As described above, the modes may include, for example, a dedicated mode, floating and embedded modes, combinations of horizontal and vertical modes, a hidden mode, and so on. These modes are described in greater detail below in connection with FIGS. 3 through 8.

Figure 2:
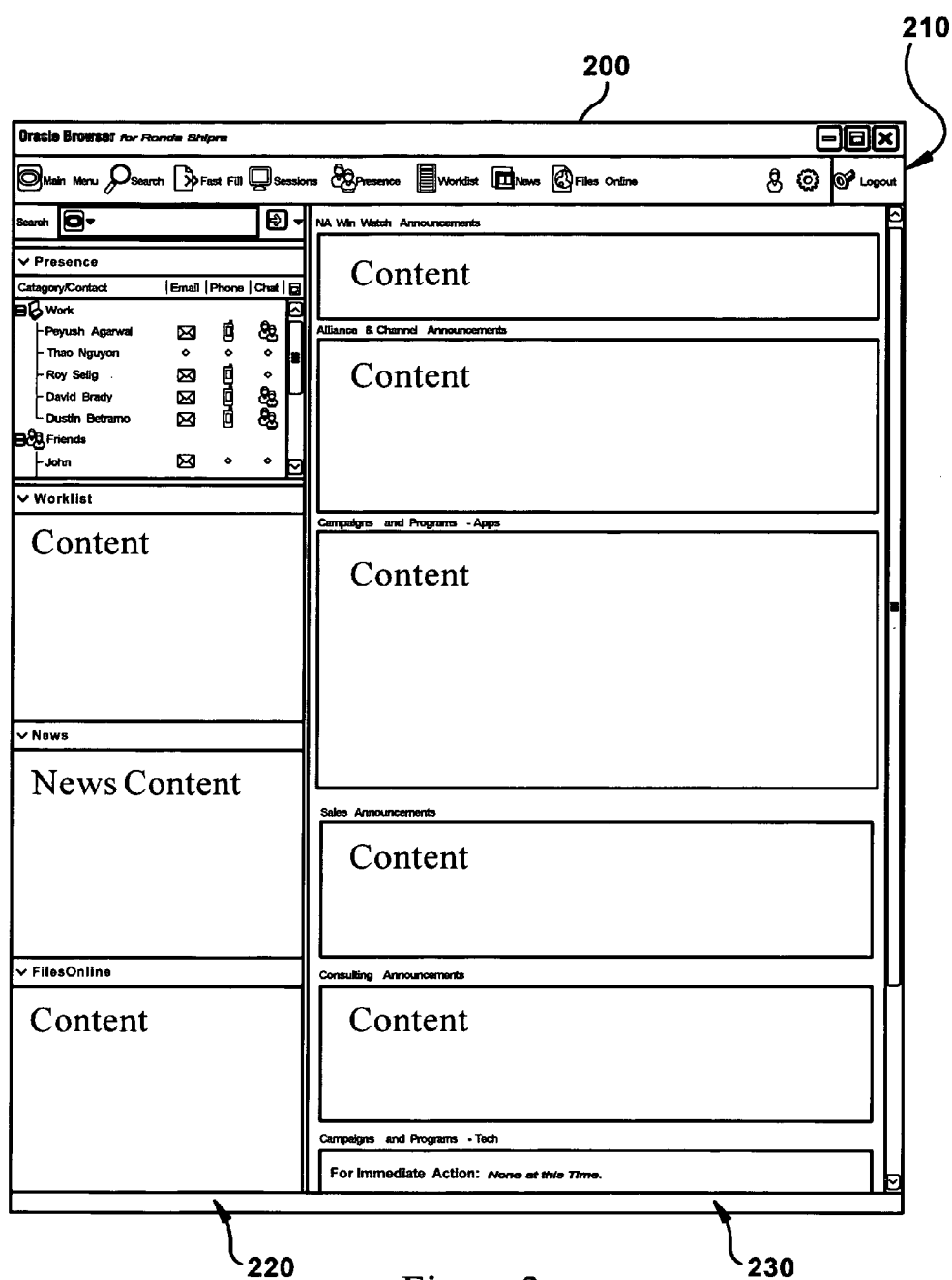
FIG. 2 illustrates a browser window associated with a multi-mode toolbar/sidebar combination.

FIG. 2 is a simulated screen shot of a browser window 200 associated with a toolbar/sidebar combination. A toolbar 210 is arranged at the top of window 200 and a sidebar 220 is arranged along the side of window 200. Window 200 displays data in a display area 230 (e.g., window pane). UI elements in toolbar 210 may be related to browser window 200, sidebar 220, and/or information in pane 230. UI elements and data in sidebar 220 may be related to browser window 200 and/or information in pane 230. In the context of an enterprise, information in pane 230 may be associated with a web-based enterprise application(s). Toolbar 210 and sidebar 220 may facilitate navigating through data in pane 230, selecting data to be displayed in pane 230, controlling how data is displayed in pane 230, taking actions on data in pane 230, and so on. The arrangement of toolbar 210 at the top of window 200 and of sidebar 230 at the side of window 200 is just one possible arrangement. Different users and different applications may configure a window with different arrangements (e.g., attached, embedded, free-floating, horizontal, vertical) as described below.

Figure 3:
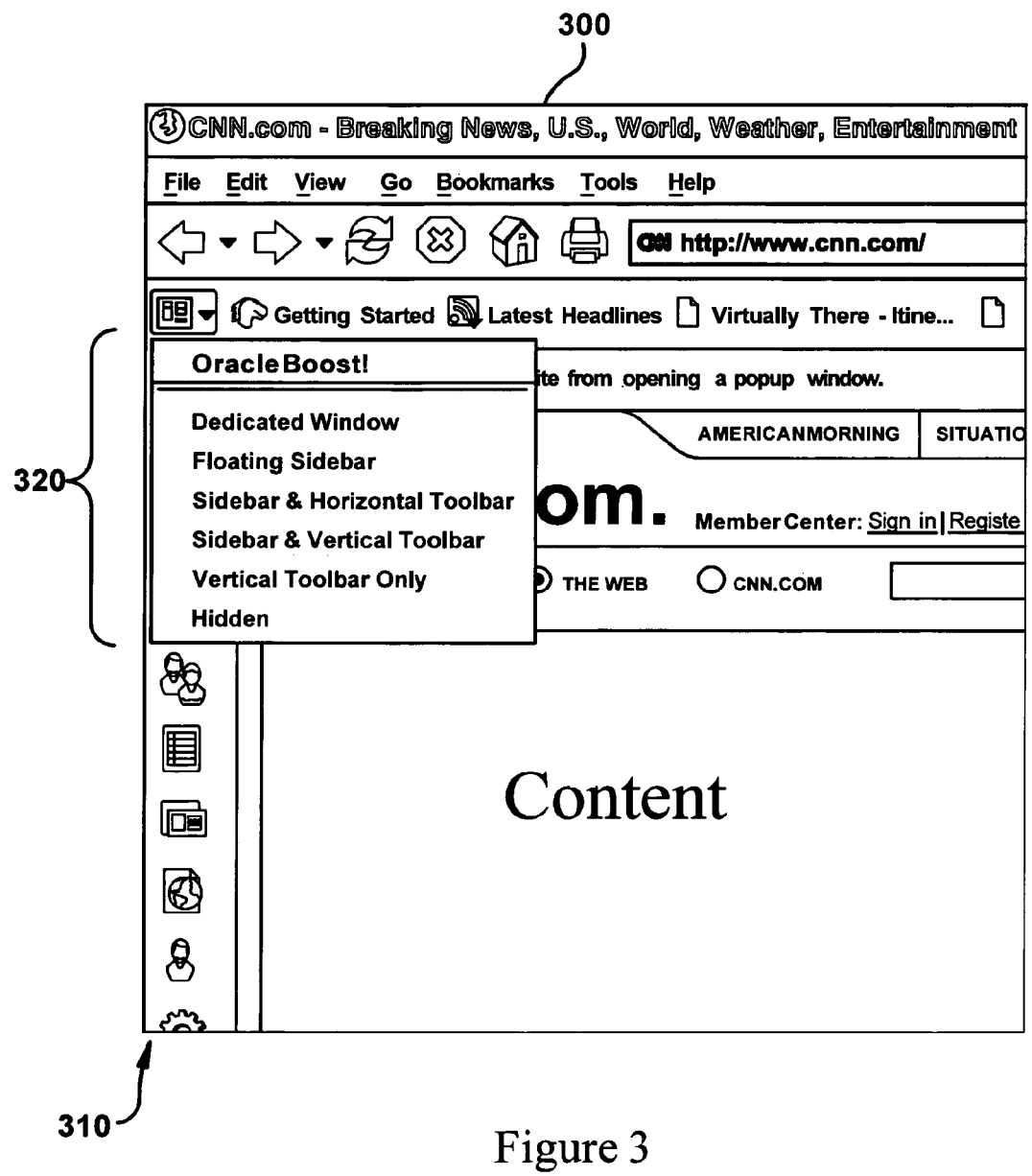
FIG. 3 is a simulated screen shot of a browser window that includes a user interface element associated with selecting a mode for a polymorphic toolbar/sidebar combination.
Figure 15:
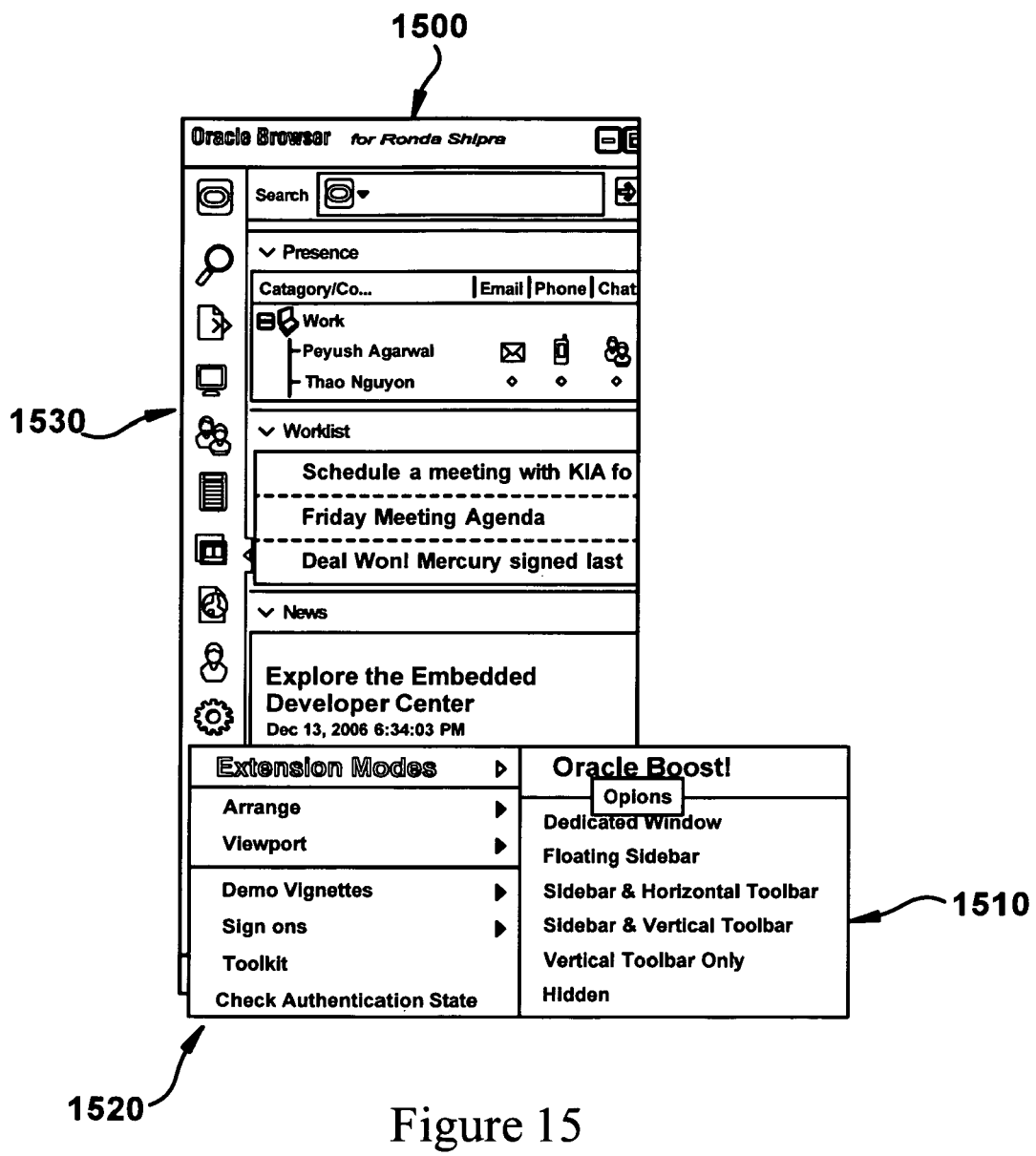
FIG. 15 is a simulated screen shot of user interface elements associated with selecting a display mode for a polymorphic toolbar/sidebar combination.
Figure 16:
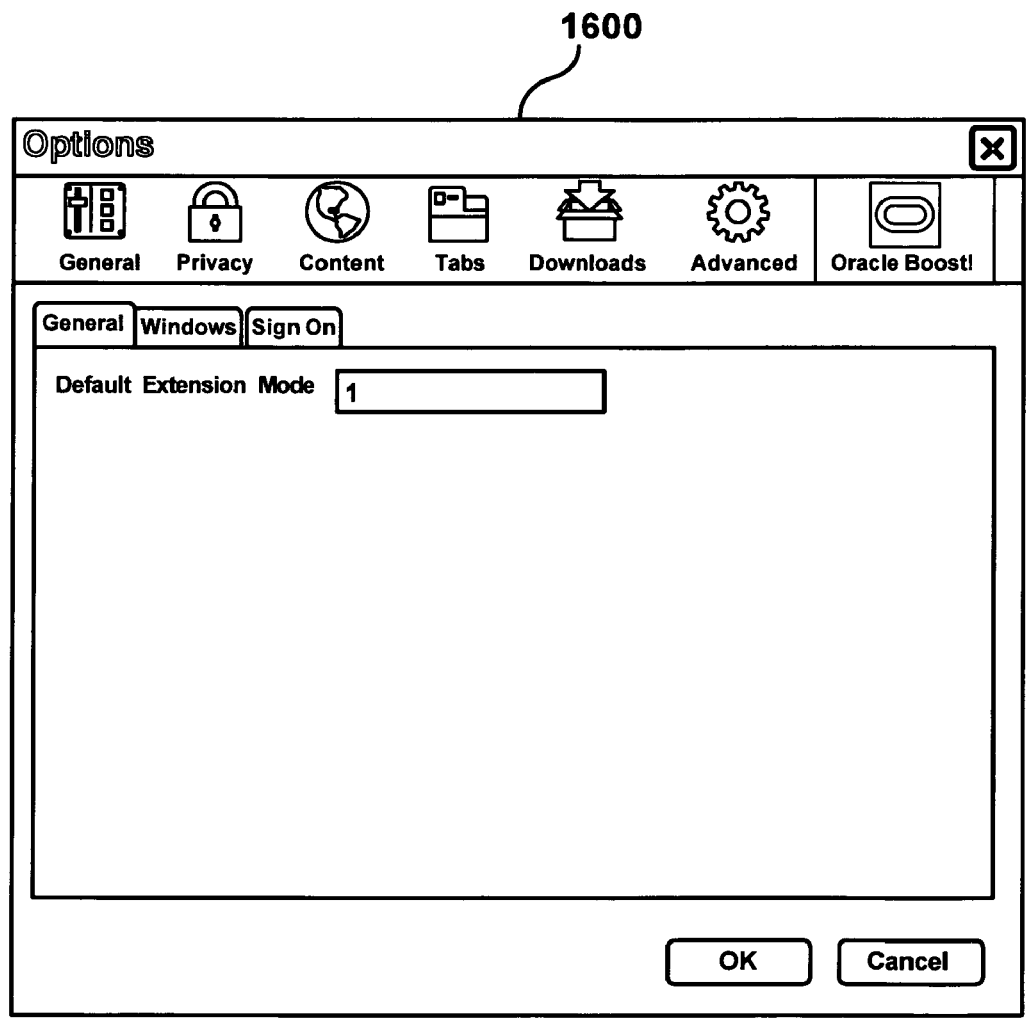
FIG. 16 is a simulated screen shot of a user interface element associated with selecting a display mode for a polymorphic toolbar/sidebar combination.

FIG. 3 is a simulated screen shot of a browser window 300 that includes a user interface element associated with selecting a mode for a polymorphic toolbar/sidebar combination. Window 300 includes a toolbar 310 from which a menu 320 has been activated. Menu 320 displays options for different modes for arranging a combination toolbar/sidebar associated with a browser extension logic as described herein. The modes include a dedicated window mode, a floating sidebar mode, a sidebar and horizontal toolbar mode, a sidebar and vertical toolbar mode, a vertical toolbar mode, and a hidden mode. While six modes are discussed in this example, it is to be appreciated that in different examples a greater and/or lesser number of modes may be available. Similarly, while a menu 320 is illustrated, it is to be appreciated that other graphical user interface elements may be associated with selecting a mode. For example, FIG. 15 illustrates a sidebar 1500 from which a menu 1510 may be accessed. Menu 1510 may be a sub-menu in another menu 1520 that is available on a toolbar 1530. Additionally, FIG. 16 illustrates an options panel 1600 that may be presented when a UI element (e.g., button) is activated to select a mode. Options panel 1600 may allow a user to select a default extension mode that may then be applied in subsequent sessions and for subsequently instantiated windows.

Figure 4:
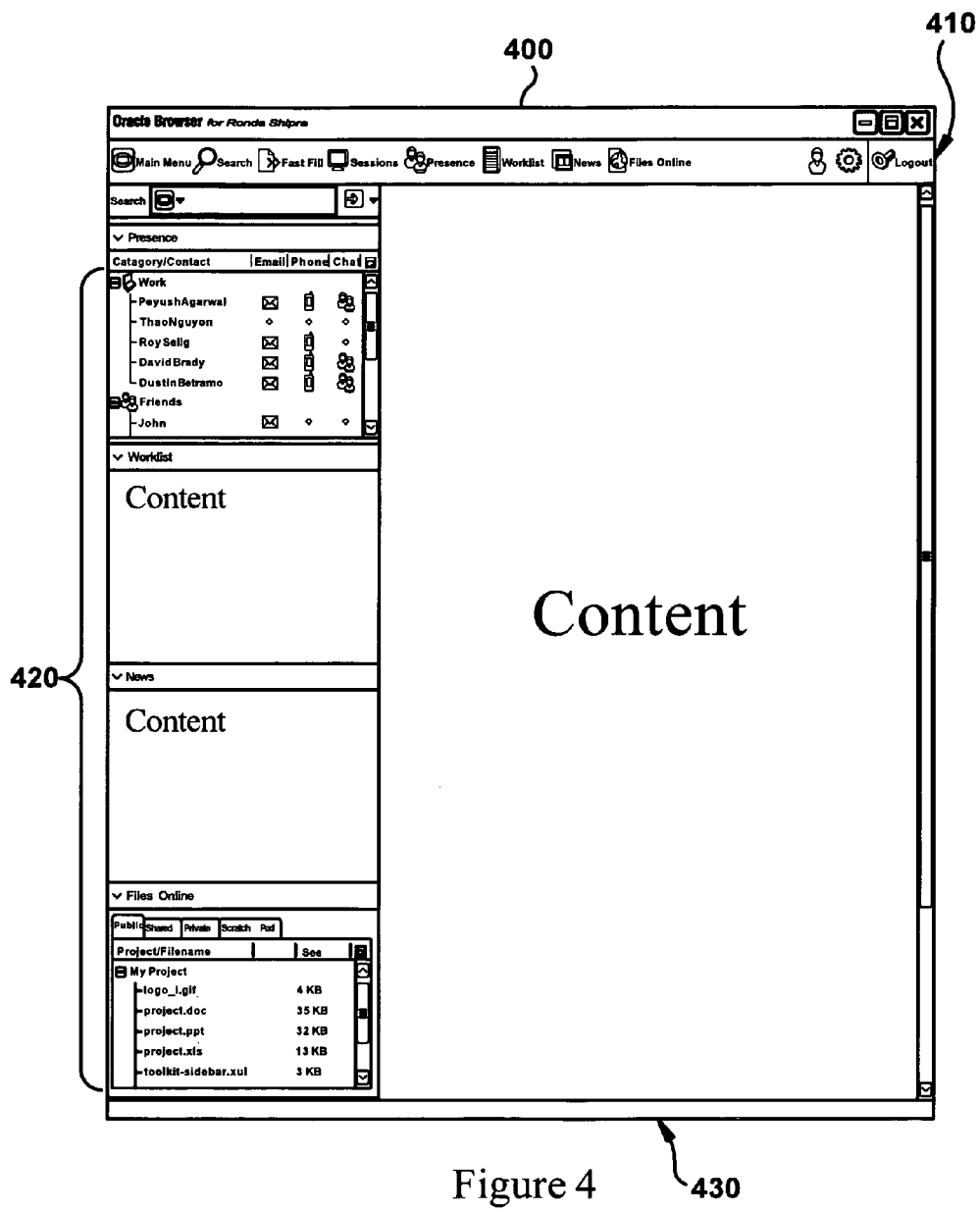
FIG. 4 is a simulated screen shot of a dedicated window instance of a polymorphic toolbar/sidebar combination.

FIG. 4 is a simulated screen shot of a dedicated window instance of a polymorphic toolbar/sidebar combination. FIG. 4 illustrates a window 400 having a toolbar 410, a sidebar 420, and a display area 430. The display area 430 displays output from a content provider (e.g., enterprise application) with which window 400 is interacting. This output may be, for example, web site content. In a dedicated window instance, a toolbar/sidebar browser extension controls browser window 400 to hide native browser chrome and to display custom chrome associated with, for example, the enterprise application(s) with which window 400 is interacting. Thus, in one example, toolbar 410 may not include standard browser chrome but may include enterprise application specific chrome while in another example toolbar 410 may have a subset of some standard browser elements grafted onto the application specific chrome. Similarly, in one example sidebar 420 may not include standard browser chrome but may include enterprise application specific chrome while in another example sidebar 420 may include a subset of standard browser elements along with application specific chrome.

Figure 5:
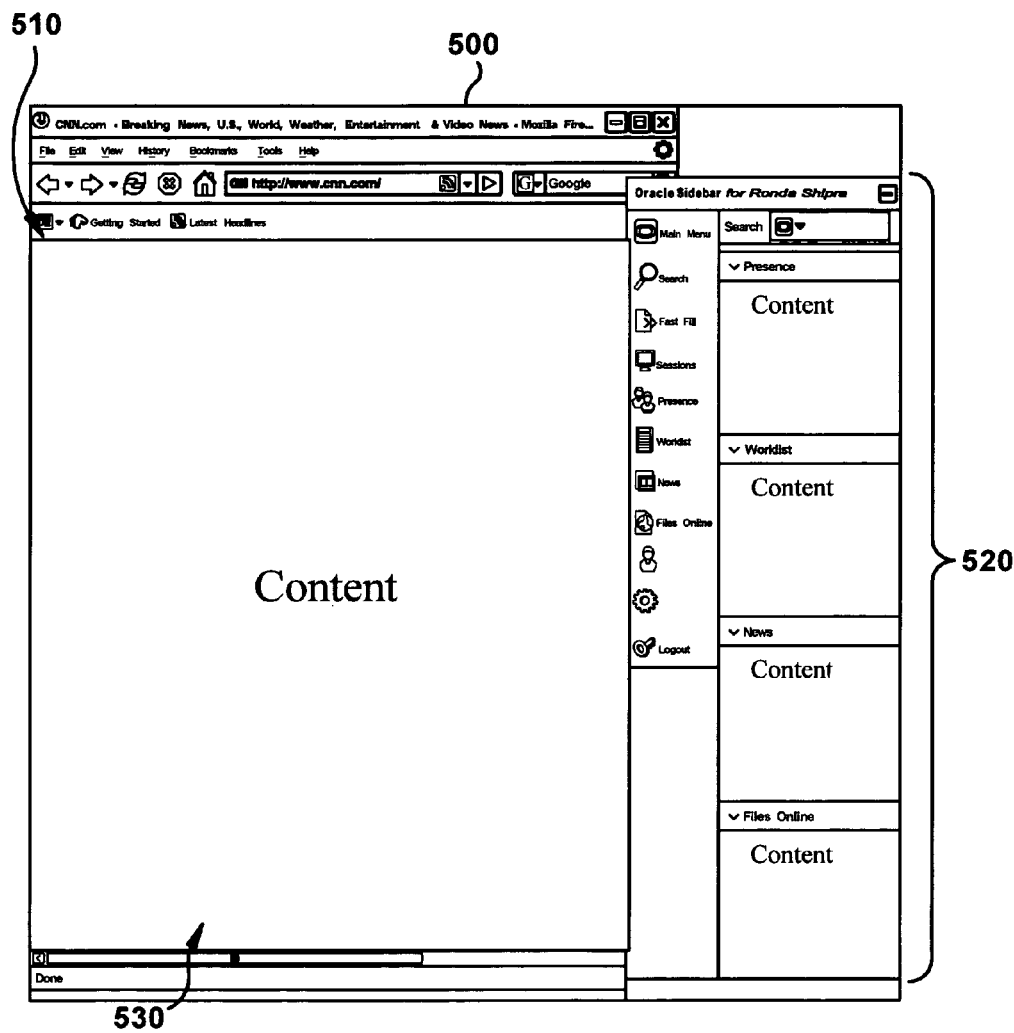
FIG. 5 is a simulated screen shot of a floating sidebar instance of a polymorphic toolbar/sidebar combination.

FIG. 5 is a simulated screen shot of a floating sidebar instance of a polymorphic toolbar/sidebar combination. FIG. 5 illustrates a browser window 500 having a toolbar 510, a sidebar 520, and a display area 530. The display area 530 displays output from a content provider (e.g., enterprise application) with which window 500 is interacting. This output may be, for example, web site content. In the floating sidebar instance, a toolbar/sidebar browser extension controls browser window 500 to launch a sidebar in its own window that may "float" over other browser windows. The floating sidebar 520 may display, for example, content associated with an enterprise application, content based on component chrome, content determined by user profile, content determined by user identification, and so on. This mode facilitates a user driving the content of display area 530 from the floating sidebar 520. This mode also facilitates a user opening and managing new browser windows while monitoring content changes in the floating sidebar 520. While floating sidebar 520 is illustrated floating on the right side of browser window 500, it is to be appreciated that the floating sidebar 520 may be positioned and repositioned in different locations. The floating sidebar 520 may include UI elements (e.g., buttons) for controlling actions and may also include UI elements (e.g., display panes) for conveying information.

Figure 6:
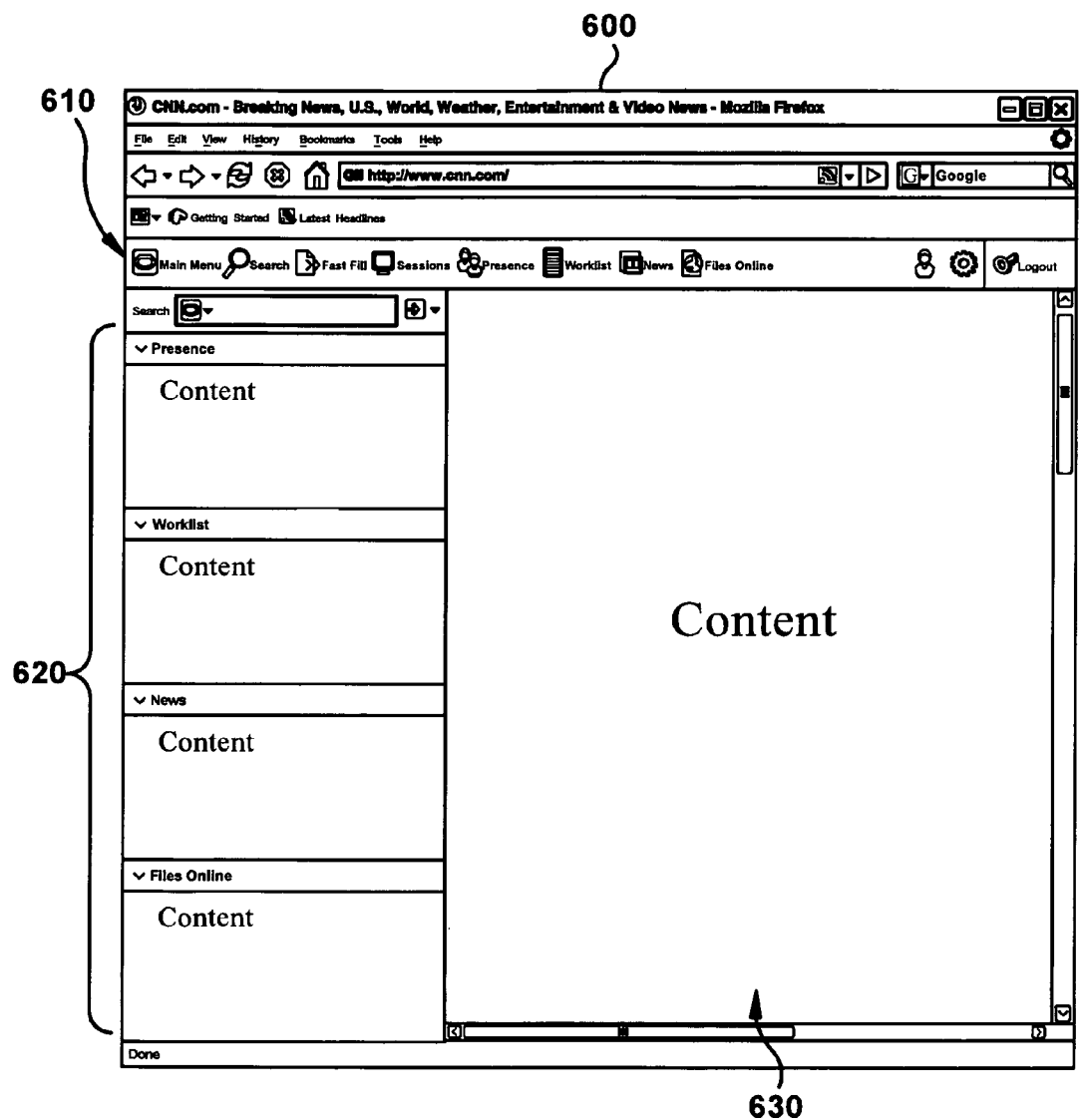
FIG. 6 is a simulated screen shot of a sidebar and horizontal toolbar instance of a polymorphic toolbar/sidebar combination.

FIG. 6 is a simulated screen shot of an embedded sidebar and horizontal toolbar instance of a polymorphic toolbar/sidebar combination. FIG. 6 illustrates a browser window 600 having a toolbar 610, a sidebar 620, and a display area 630. The display area 630 displays output from a related entity (e.g., content provider, enterprise application) with which window 600 is interacting. This output may be, for example, web site content. In an embedded horizontal toolbar and sidebar instance, a toolbar/sidebar browser extension controls browser window 600 to display toolbar 610 as part of an existing browser window (e.g., window 600). Chrome associated with the toolbar 610 may be displayed and appear horizontally across the top of the browser window 600. Toolbar 610 may display UI elements that include, for example, icons with labels. The toolbar/sidebar combination may also control browser window 600 to display sidebar 620 as part of an existing browser window. Chrome associated with the sidebar 620 may be displayed and appear vertically down the side of the browser window 600. In FIG. 6, the sidebar 620 appears on the left side of browser window 600. It is to be appreciated that sidebar 620 may appear in other locations (e.g., along right side of browser window 600). In this embedded sidebar and toolbar example, sidebar 620 may be closed without affecting toolbar 610. This may facilitate providing additional display real estate for display area 630.

Figure 7:
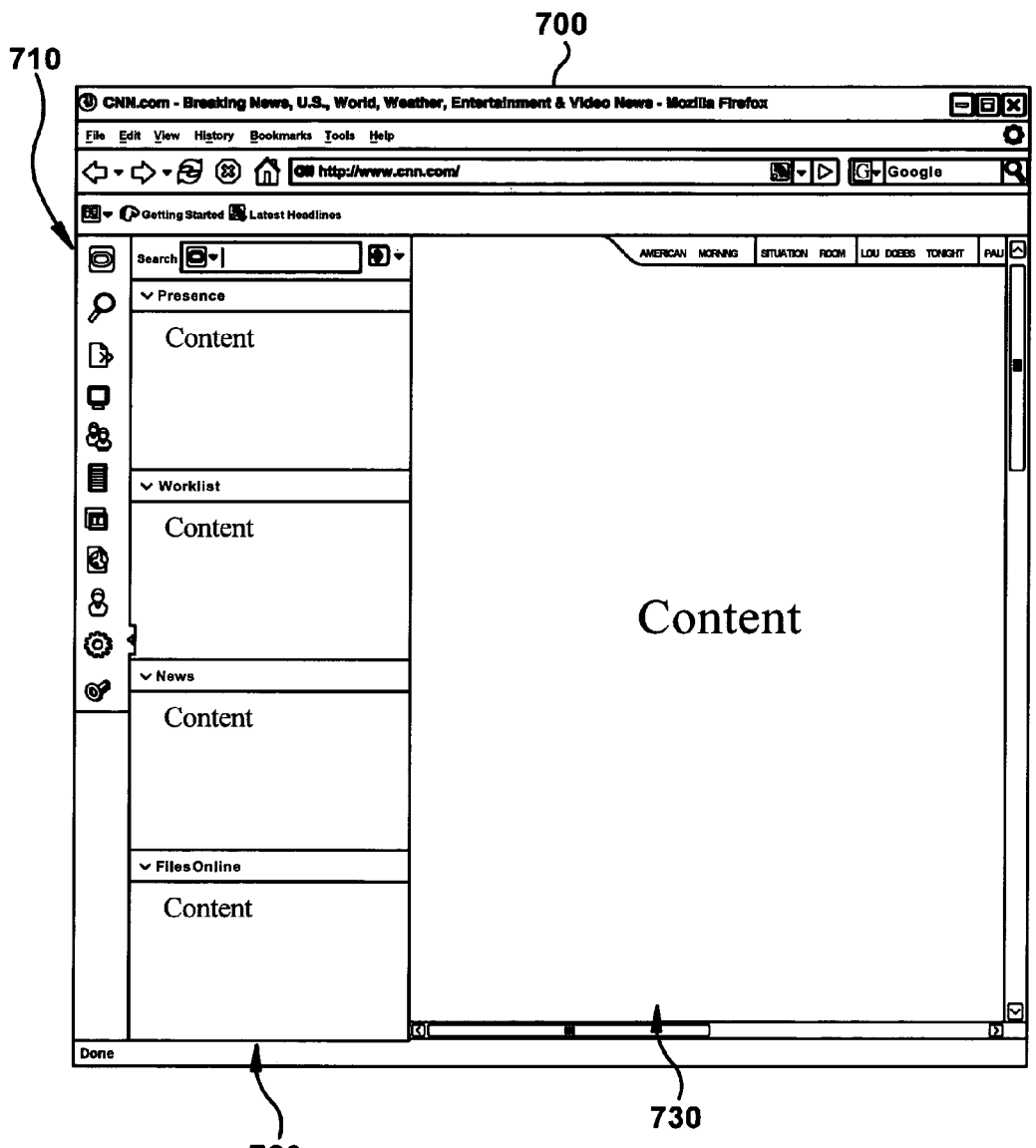
FIG. 7 is a simulated screen shot of a sidebar and vertical toolbar instance of a polymorphic toolbar/sidebar combination.

FIG. 7 is a simulated screen shot of a sidebar and vertical toolbar instance of a polymorphic toolbar/sidebar combination. FIG. 7 illustrates a browser window 700 having a toolbar 710, a sidebar 720, and a display area 730. The display area 730 displays output from, for example, a content provider (e.g., enterprise application) with which window 700 is interacting. This output may be, for example, web site content. In an embedded vertical toolbar and sidebar instance, a toolbar/sidebar browser extension controls browser window 700 to display toolbar 710 as part of an existing browser window (e.g., window 700). Chrome associated with the toolbar 710 may be displayed and appear vertically along the side of the browser window 700. Toolbar 710 may display UI elements that include, for example, icons. Labels associated with the icons may not be displayed to save real estate and thus yield more room for content in display area 730. The toolbar/sidebar browser extension may also control browser window 700 to display sidebar 720 as part of an existing browser window. Chrome associated with the sidebar 720 may also be displayed and may also appear vertically down the side of the browser window 700. In FIG. 7, the toolbar 710 appears on the left side of sidebar 720 and sidebar 720 appears on the left side of browser window 700. It is to be appreciated that toolbar 710 and/or sidebar 720 may appear in other locations (e.g., along right side of browser window 700). In this embedded sidebar and toolbar example, sidebar 720 may be closed without affecting toolbar 710. This may facilitate providing additional display real estate for display area 730.

Figure 8:
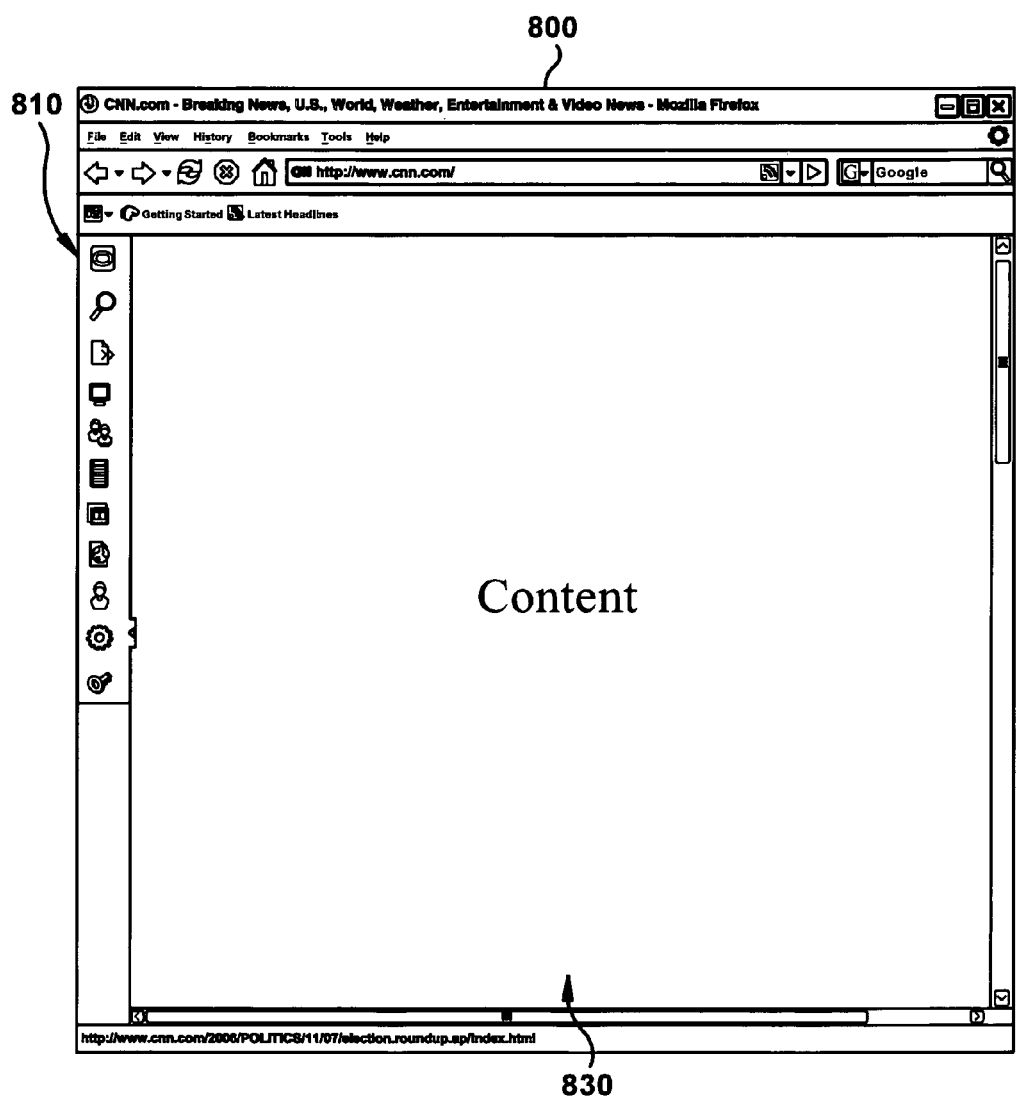
FIG. 8 is a simulated screen shot of a vertical toolbar only instance of a polymorphic toolbar/sidebar combination.

FIG. 8 is a simulated screen shot of a toolbar only instance of a polymorphic toolbar/sidebar combination. FIG. 8 illustrates a browser window 800 having a toolbar 810 and a display area 830. The display area 830 displays output from an entity (e.g., enterprise application) with which window 800 is interacting. This output may be, for example, web site content associated with an enterprise application. For example, a purchase order application may provide images of purchase orders and/or data entry screens associated with purchase orders. In an embedded vertical toolbar instance, a toolbar/sidebar browser extension controls browser window 800 to display toolbar 810 as part of an existing browser window (e.g., window 800). Chrome associated with the toolbar 810 may be displayed and appear vertically along the side of the browser window 800. Toolbar 810 may display UI elements that include, for example, icons. Labels associated with the icons may not be displayed to save real estate and thus yield more room for content in display area 830. In FIG. 8, the toolbar 810 appears on the left side of browser window 800. It is to be appreciated that toolbar 810 may appear in other locations (e.g., along right side of browser window 800). In this embedded toolbar example, a sidebar (not illustrated) may be available and may be opened and/or closed without affecting toolbar 810. This may facilitate selectively providing additional display real estate for display area 830.

FIGS. 4 through 8 have illustrated several modes and/or states for displaying a toolbar/sidebar combination and associated chrome. In one example, a user may select a "hidden" state that controls whether a toolbar, sidebar, and/or chrome will be displayed on a browser window. This state, along with the other modes, may be selected using a mode access point. The mode access point may be a UI element including, for example, a bookmark, a menu entry, an options panel, and so on. In one example, a current setting for a toolbar/sidebar combination mode can be stored and thus can be used to control related new windows as they are opened. The browser extension can employ the stored mode across different browser sessions and with different related browser windows. A toolbar/sidebar combination mode may be associated with different entities including, for example, a single user, a session, an enterprise application, a class of users, and so on.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms like processing, transmitting, retrieving, communicating, calculating, determining, displaying, and so on, refer to actions and processes of a computer system, logic, processor, or similar electronic device that manipulates and transforms data represented as physical (electronic) quantities.

Figure 9:
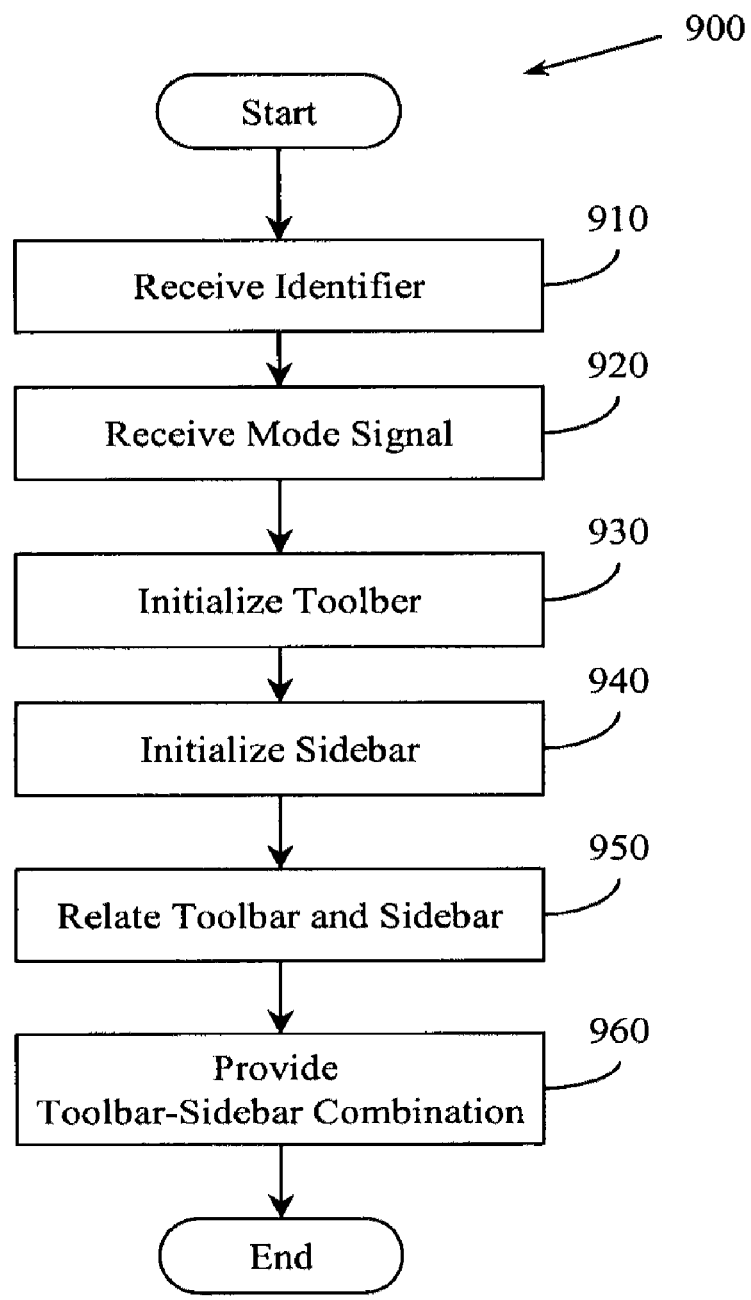
FIG. 9 illustrates an example method associated with providing a polymorphic toolbar/sidebar combination.

FIG. 9 illustrates a method 900 associated with providing a multimode (e.g., polymorphic) toolbar/sidebar combination. Method 900 may include, at 910, receiving an identifier of a browser window with which a browser extension is to interact. The identifier may be, for example, a GUID (globally unique identifier), a handle, a pointer, and so on. The browser window may be provided by a browser. The browser may be running on a device (e.g., computer) on which method 900 may also run. In one example method 900 may be performed by a browser extension running on a computer.

Method 900 may also include, at 920, receiving a mode signal concerning the toolbar-sidebar combination to be provided to the browser window by the browser extension. The mode signal may identify locations, orientations, functionality, visibility, interoperability, and so on, of the toolbar and/or sidebar. In one instance the mode signal may identify that a dedicated window mode is to be established for the toolbar-sidebar combination. Establishing the dedicated window mode may include, for example, connecting the user interface toolbar to the browser window and connecting the user interface sidebar to the browser window. Establishing the dedicated window mode may also include suppressing native browser chrome associated with the browser window and presenting custom chrome associated with a content provider in the user interface toolbar and/or the user interface sidebar.

In another instance, the mode signal may identify that a floating sidebar mode is to be created. Establishing the floating sidebar mode may include connecting the user interface toolbar to the browser window and not connecting the user interface sidebar to the browser window. In the floating sidebar mode, content displayed in the browser window may be controlled, at least in part, by a user interaction with the user interface sidebar.

In another example, the mode signal may identify that an embedded sidebar and horizontal toolbar mode is to be created. Creating this mode may include incorporating the user interface toolbar and sidebar into the browser window. Creating this mode may also include allowing the user interface sidebar to be closed without affecting the user interface toolbar. In this mode, the user interface toolbar may be oriented horizontally with respect to the browser window. In one example, it may be oriented horizontally at or near the top of a browser window. In one example, the sidebar may be oriented vertically along an edge (e.g., inside left edge) of the browser window with which the toolbar is associated.

In another example, the mode signal may identify that an embedded sidebar and vertical toolbar mode is to be established. In this mode, both the user interface toolbar and sidebar may be incorporated into the browser window. Like the previous mode, the user interface sidebar may be closed without affecting the user interface toolbar. Unlike the previous mode, the user interface toolbar may be oriented vertically along a side of the browser window. The sidebar may also be oriented vertically along a side of the browser window. In one example the toolbar and sidebar may both be positioned along the same edge (e.g., inside left edge) of a browser window while in another example the sidebar and toolbar may be located along different edges of the browser window.

In another example, the mode signal may identify that a toolbar only mode is to be created. In this mode, the user interface toolbar may be incorporated into the browser window and no sidebar may be provided by method 900. A sidebar may be provided by another logic and the toolbar may operate independently of this independent sidebar.

In another example, the mode signal may identify that a hidden mode is to be created. In the hidden mode, the user interface toolbar may be incorporated into the browser window and may be configured to facilitate viewing content that would otherwise not be viewable when a sidebar is hidden. Thus, the toolbar may include a user interface element related to a user interface sidebar content. The user interface sidebar content may be temporarily displayed when the user interface toolbar element is selected. For example, a popup window may be instantiated when an icon on a toolbar is selected.

While a number of different modes are described above, it is to be appreciated that method 900 may include establishing a greater and/or lesser number of modes based on a mode signal. Additionally, other combinations of attachment (e.g., embedded, floating, attached) and presentation (e.g., horizontal, vertical) may be associated with these other modes.

Method 900 may also include, at 930, initializing a user interface toolbar to form part of the toolbar-sidebar combination and to be associated with the browser window. To account for the modes described above, the initializing may be based, at least in part, on the mode signal. As described above, a toolbar may be located in different positions and may have different attachment and/or functionality. Therefore, in one example, initializing 930 the user interface toolbar may include establishing a location for the toolbar, a size for the toolbar, a set of functionality for the toolbar, and a subset of native browser toolbar functionality to be included in the set of functionality for the toolbar. In different examples, the subset of native browser functionality may include all the native functionality, a subset of the native functionality, and/or none of the native functionality.

Method 900 may also include, at 940, initializing a user interface sidebar to form part of the toolbar-sidebar combination and to be associated with the browser window. The initializing may be based, at least in part, on the mode signal. In different examples, initializing 940 the user interface sidebar may include establishing a location for the sidebar, a size for the sidebar, a set of functionality for the sidebar, and a subset of native browser sidebar functionality to be included in the set of functionality for the sidebar. Once again the subset of native browser sidebar functionality to be included may include all, some, or none of the native functionality.

The mode signal may be provided by the browser window in response to a user selection of a mode. The user may select the mode by interacting with a graphical user interface element. For example, the user may select a menu item from a menu associated with the browser window, may select a bookmark item from a graphical user interface element associated with the browser window, may enter data into an options panel provided by the browser window, and so on. It is to be appreciated that in different examples different access points may be used to select the mode.

Method 900 may also include, at 950, establishing a relationship between the user interface toolbar and the user interface sidebar to facilitate collectively managing the user interface toolbar and the user interface sidebar as the toolbar-sidebar combination. Establishing the relationship may include, for example, establishing pointers, establishing a pipe, establishing a communication path (e.g., socket, shared memory), initializing interrupt handlers, configuring event handlers, and so on. The relationship may, for example, facilitate controlling sidebar content display through the use of toolbar icons. The relationship may also, for example, facilitate controlling a content provider (e.g., enterprise application) that is providing content displayed in the sidebar.

Method 900 may also include, at 960, selectively providing the toolbar-sidebar combination to the browser window associated with the identifier. The location of the toolbar-sidebar combination with respect to the browser window may be controlled, at least in part, by the mode signal. Additionally, the presence and functionality of native browser chrome associated with the browser window may depend, at least in part, on the presence and functionality of the toolbar-sidebar combination. Having once provided a toolbar-sidebar combination in accordance with a selected mode, method 900 may selectively control a browser to instantiate a subsequent browser window in accordance with the mode signal. This may involve discovering and/or storing a most recently selected mode and applying that mode to subsequently created windows and/or sessions.

Figure 10:
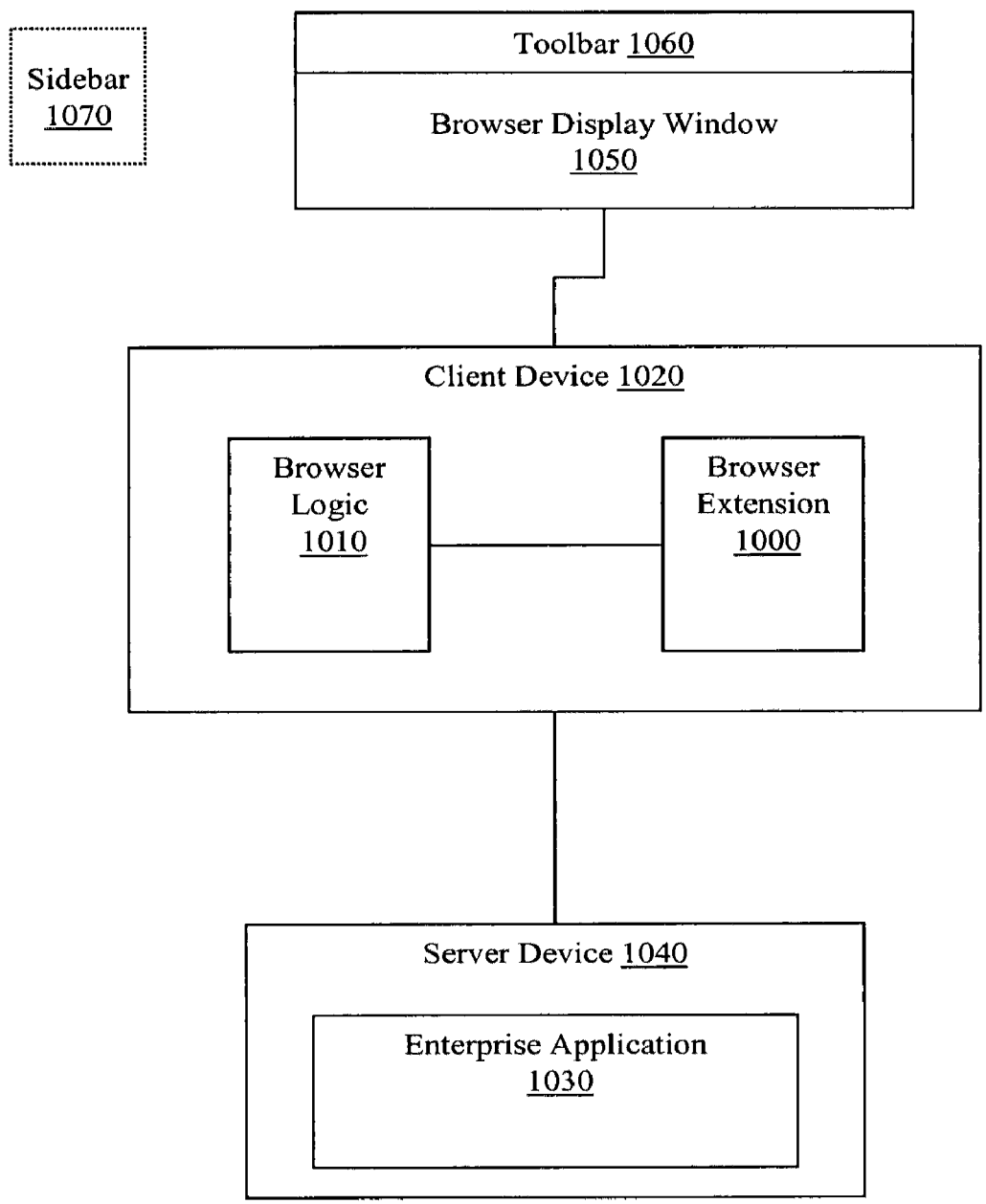
FIG. 10 illustrates an example browser extension associated with toolbar/sidebar replication associated with sidebar hiding.

FIG. 10 illustrates an example browser extension 1000 associated with toolbar/sidebar replication and sidebar hiding. A user may want to hide a sidebar 1070 to yield more space to display content. Hiding the sidebar 1070 will cause a loss of visibility of the content in the sidebar 1070. However, the user may also want to stay abreast of the now hidden content in the sidebar 1070. Thus, browser extension 1000 may selectively replicate sidebar content using a toolbar 1060. In one example, content in sidebar 1070 may be displayed in a pane that can be collapsed to yield more space to display web page content. The browser extension 1000 may associate hidden content with a toolbar 1060 UI element (e.g., icon). By way of illustration, an icon on toolbar 1060 may be associated with a hidden content pane associated with sidebar 1070 after it is hidden. Accessing (e.g., clicking on, hovering over) the icon on the toolbar 1060 may cause a temporary display of the related hidden content. For example, a "flyout" window may be displayed adjacent to the accessed icon. The flyout window may display the related hidden content. When the icon is deactivated (e.g., click again, stop hover) the flyout window may be removed. This facilitates providing temporary visibility to related hidden content without disturbing the layout of the browser windows.

Browser extension 1000 may run on a client device 1020 along with a browser logic 1010. Browser logic 1010 and browser extension 1000 may provide output to a browser display window 1050. The browser display window 1050 may have an associated toolbar 1060 and an associated sidebar 1070. The browser display window 1050 may display content associated with, for example, an enterprise application 1030 running on a server device 1040.

Browser extension 1000 may create a relationship between toolbar 1060 and sidebar 1070. Sidebar 1070 may be hidden. Information that has been hidden by hiding sidebar 1070 may be replicated and displayed to a user from a different access point (e.g., toolbar 1060) without having to unhide sidebar 1070. The screen real estate management provided by browser extension 1000 produces minimal disruption to content on the display window 1050.

Figure 11:
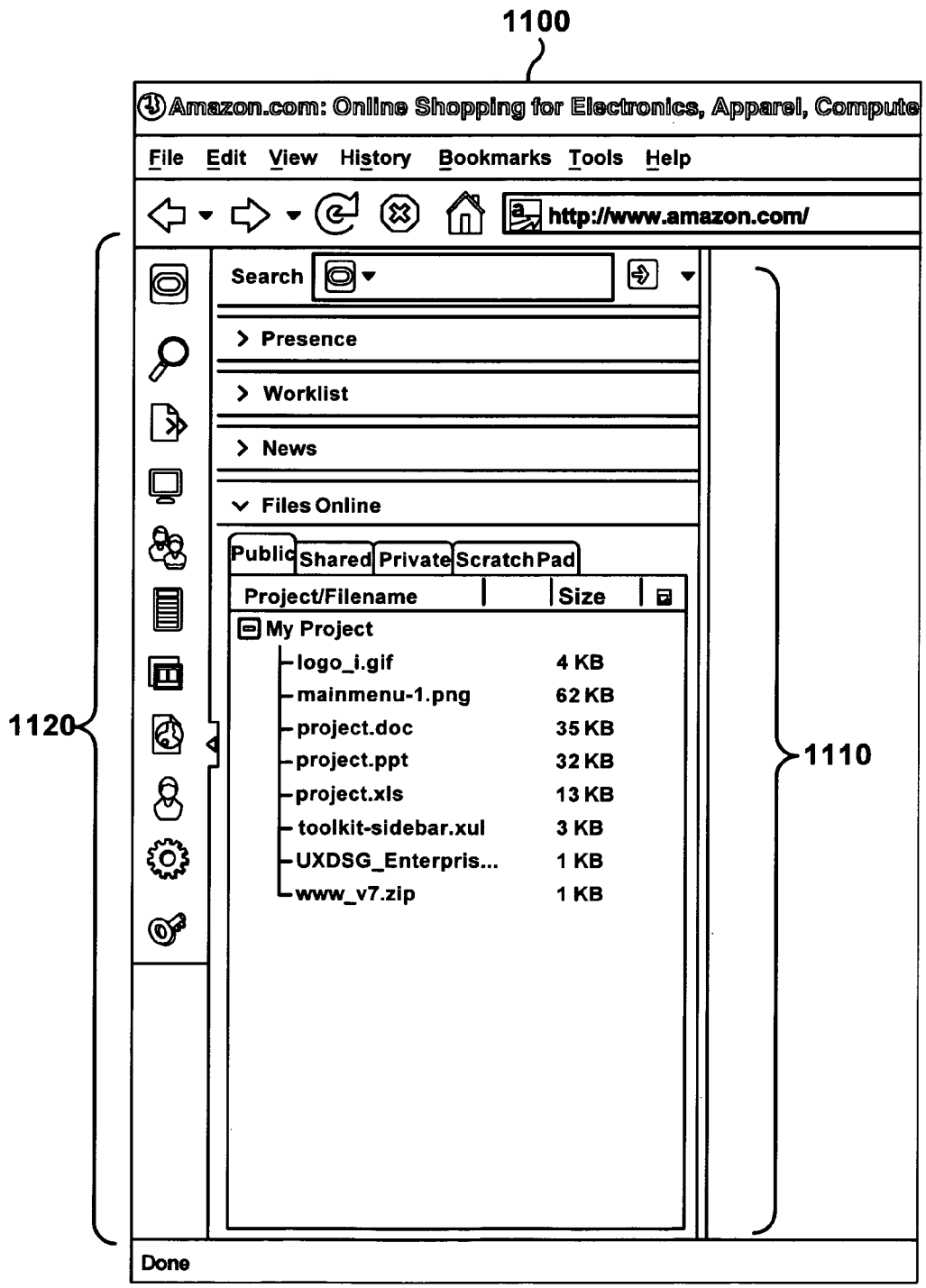
FIG. 11 is a simulated screenshot of a sidebar associated with toolbar/sidebar replication.
Figure 12:
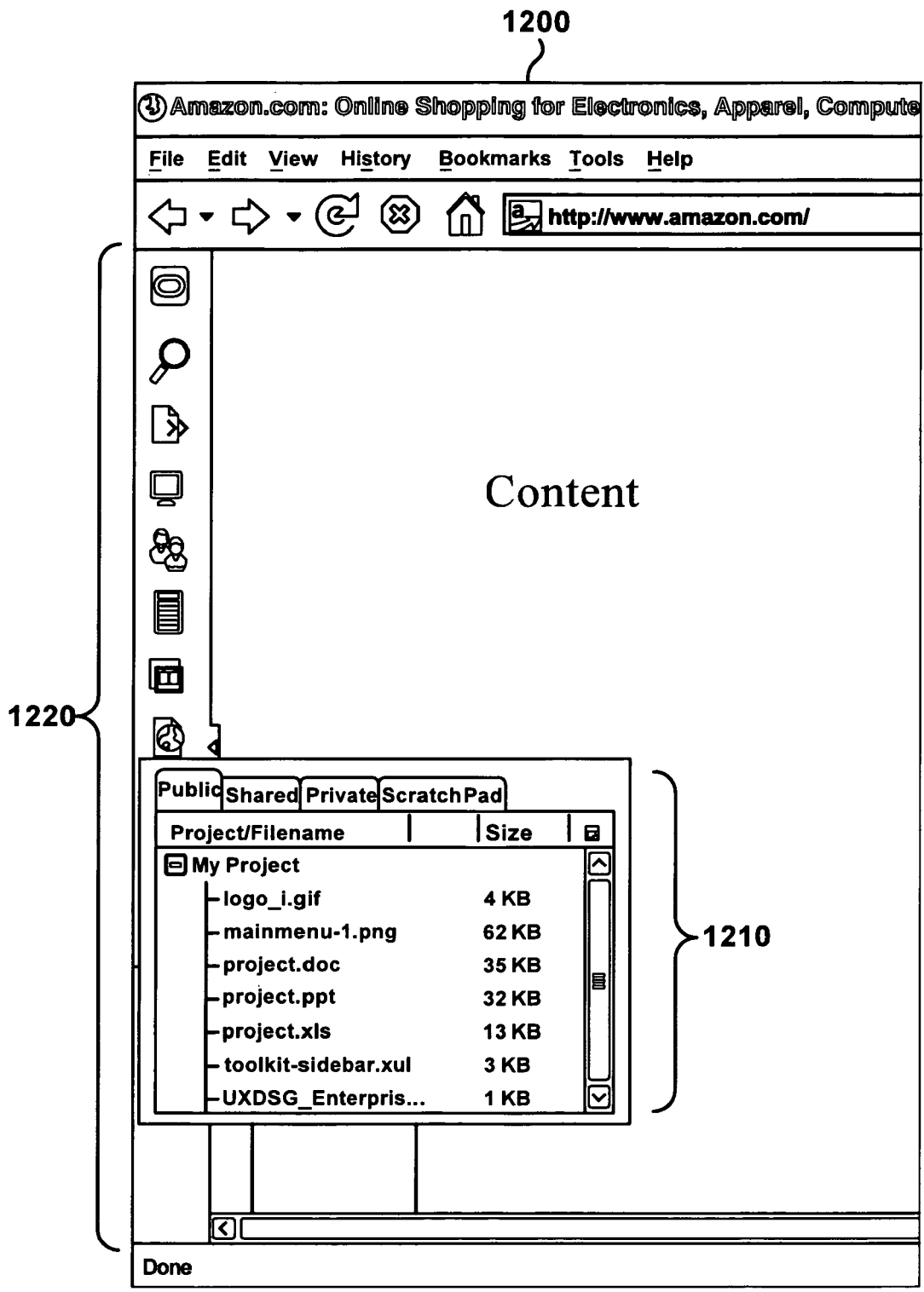
FIG. 12 is a simulated screenshot of a toolbar associated with toolbar/sidebar replication.

FIG. 11 is a simulated screenshot 1100 of a sidebar 1110 associated with toolbar/sidebar replication. Screenshot 1100 illustrates a sidebar 1110 and a toolbar 1120. Sidebar 1110 includes a number of panes (e.g., presence, work list, news, files online, and so on. In screenshot 1100 the sidebar 1120 is open and visible. However, the sidebar 1110 may become hidden. Even though sidebar 1110 may become hidden, a user may still be interested in some of the content in the sidebar 1110. Thus, FIG. 12 is a simulated screenshot 1200 where a sidebar has been hidden and content in the hidden sidebar is still selectively temporarily viewable. The hidden sidebar has some content that is being displayed in a flyout window 1210 after an icon has been accessed on toolbar 1220. Accessing the icon may include, for example, clicking on the icon. While a flyout window 1210 and an icon on toolbar 1210 are illustrated, it is to be appreciated that content from a hidden sidebar pane may be displayed using different UI elements and that the hidden content may be displayed upon activation of different UI elements associated with toolbar 1220.

Figure 13:
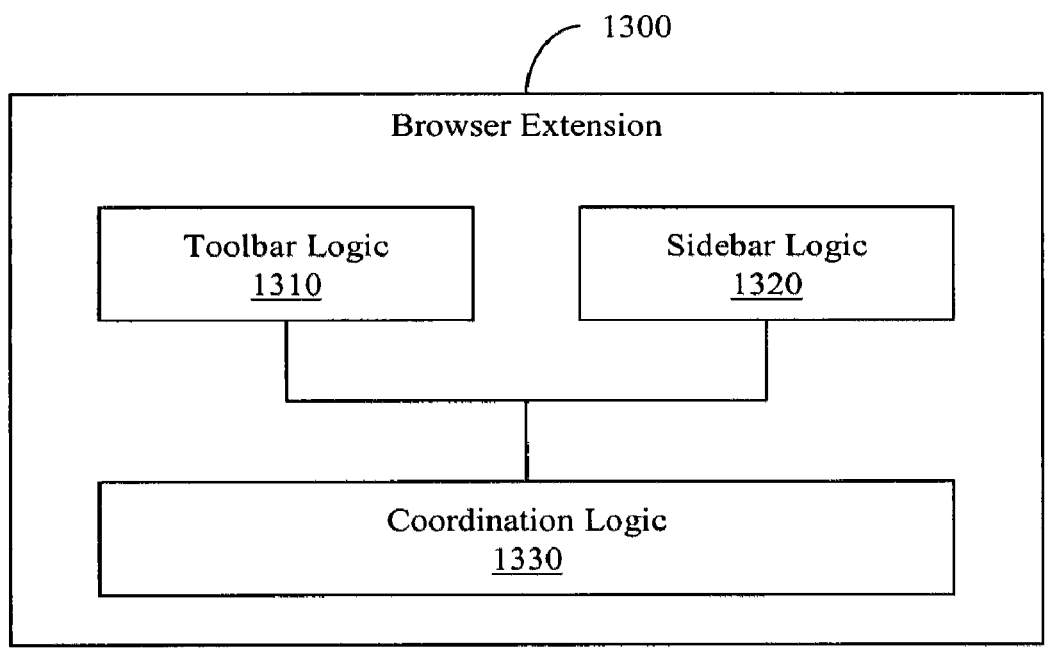
FIG. 13 illustrates an example browser extension.

FIG. 13 illustrates an example browser extension 1300. Browser extension 1300 may include, for example, a toolbar logic 1310 to provide a toolbar. The toolbar may be, for example, a collection of graphical user interface elements (e.g., icons, buttons, menus) with which a set of functionality is associated. The functionality may be associated with a browser and/or with a content provider (e.g., enterprise application). Browser extension 1300 may also include a sidebar logic 1320 to provide a sidebar. The sidebar may also be a collection of graphical user interface elements (e.g., window panes, control elements) with which a set of content and/or functionality is associated. Conventionally, a toolbar and a sidebar would be provided, if at all, by a browser and would be controlled individually.

Browser extension 1300 also includes a coordination logic 1330 to coordinate the presentation, functionality, and/or interoperability of a combination of the toolbar and the sidebar. Thus, rather than operating independently under the control of a browser, a toolbar and a sidebar may be provided as a combination that can be managed collectively. The combination may be provided to a browser. The presentation, functionality, and interoperability of the combination may be controlled, at least in part, by a selectable presentation mode and a selectable attachment mode. The presentation mode and/or the attachment mode may be user selectable from graphical user interface elements (e.g., menu items, options panels) associated with a browser.

In one example, the presentation mode may determine a set of functionality that is to be provided by the browser and the browser extension 1300. The set of functionality may include functionality provided by the browser and/or the browser extension 1300. Thus, the functionality may concern browser actions (e.g., open/close window, move window, resize window, format content) and/or content provider actions (e.g., acquire data, refresh data, update data). This functionality may be invoked, for example, through the toolbar and/or through the sidebar. The presentation mode may be, for example, a standard browser mode, a standard browser plus extension mode, and an extension mode. In a standard browser mode, only chrome associated with a browser may be displayed and thus only functionality associated with the browser may be available. In the standard browser plus extension mode chrome associated with both a browser and a content provider (e.g., enterprise application) associated with the browser extension 1300 may be provided. In the extension mode, only chrome associated with a content provider associated with the browser extension 1300 may be provided.

The attachment mode may control the location of the toolbar, the location of the sidebar, and/or the independence of the combination of the toolbar and sidebar with respect to a browser window provided by the browser. For example, the toolbar may be controlled to be oriented horizontally along the top of a window, vertically along the side of a window, and so on. Similarly, the sidebar may be controlled to be oriented vertically at different sides of a window. It is to be appreciated that different horizontal and vertical arrangements may be provided. The attachment mode may be, for example, an embedded mode, an attached mode, and a floating mode. In one example, the embedded mode includes establishing the combination of the toolbar and the sidebar as graphical user interface elements that are part of the browser window. In one example, the attached mode includes establishing the combination of the toolbar and the sidebar as graphical user interface elements that can be managed separately from the browser window. In one example, the floating mode includes establishing the sidebar as a graphical user interface element that can be managed separately from the browser window and that can be positioned separately from the browser window. Thus, the toolbar and/or sidebar may become part of the browser window, may appear to become part of the browser window and yet maintain some autonomy, and/or may look and behave autonomously.

In one example, the presentation mode and the attachment mode may be indicated by a single identifier. Additionally, the presentation mode and attachment mode may combine to form a hidden mode where content associated with the sidebar is to be temporarily displayed when the sidebar is hidden when an element on the toolbar associated with the content is activated.

A user may wish to establish a mode once and then forget about it. Thus, the browser extension 1300 may include logic to discover, store, and/or recall a previously established mode. In one example, the browser extension 1300 may include a listener logic to determine a last known presentation mode for the combination of the toolbar and the sidebar. With the last known presentation mode available, the browser extension 1300 may control a browser to create a subsequent browser window in accordance with the last known presentation mode.

Figure 14:
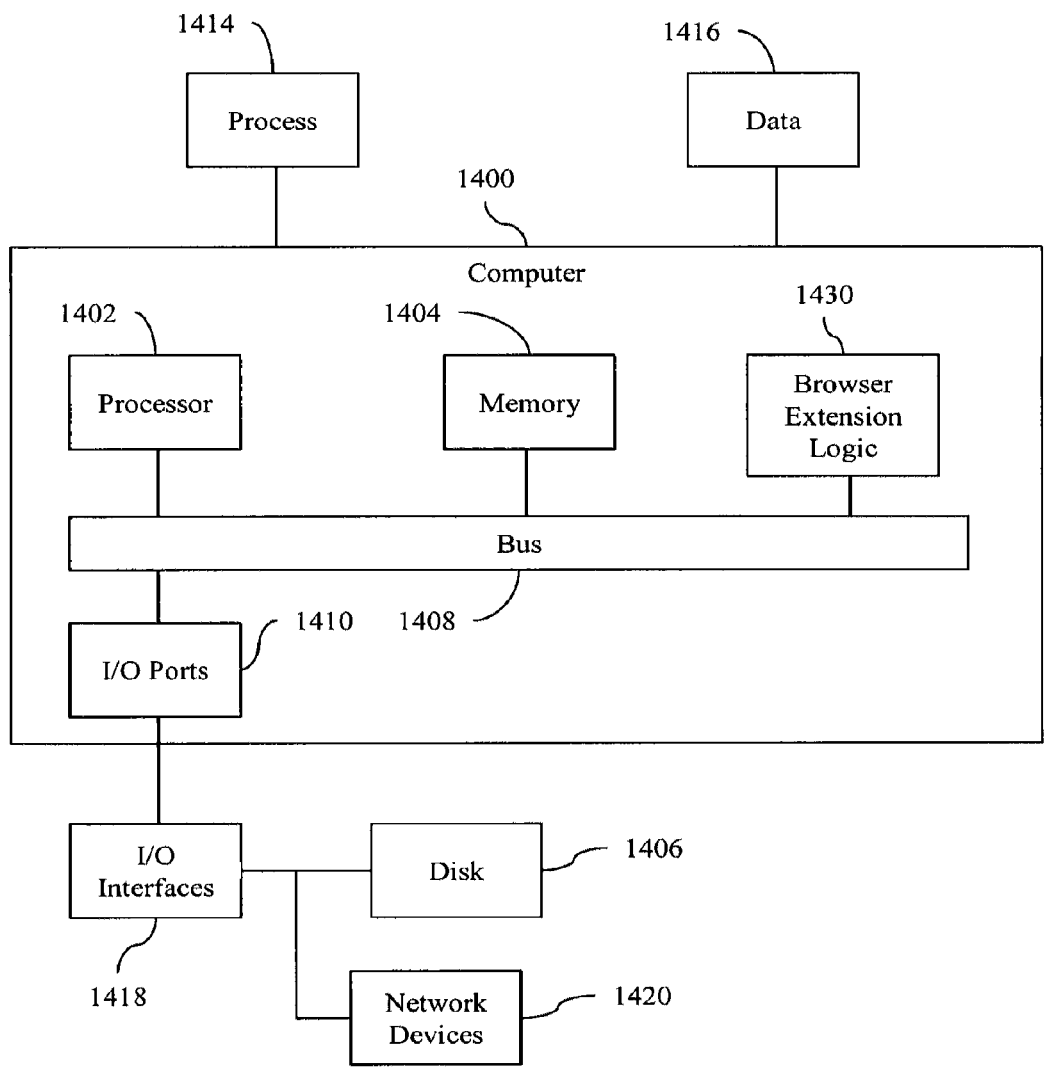
FIG. 14 illustrates an example computing device in which example systems and/or methods may operate.

FIG. 14 illustrates an example computing device in which example systems and methods described herein, and equivalents, may operate. The example computing device may be a computer 1400 that includes a processor 1402, a memory 1404, and input/output ports 1410 operably connected by a bus 1408. In one example, the computer 1400 may include a browser extension logic 1430 configured to facilitate adding coordinated toolbar-sidebar functionality to a browser. In different examples, the logic 1430 may be implemented in hardware, software, firmware, and/or combinations thereof. Thus, the logic 1430 may provide means (e.g., hardware, software, firmware) for providing a toolbar-sidebar combination to a browser. Logic 1430 may also provide means (e.g., hardware, software, firmware) for selectively controlling the toolbar-sidebar combination to operate collectively according to a selected mode. In different examples the selected mode controls the location, orientation, interoperability, and/or functionality of the toolbar-sidebar combination. While the logic 1430 is illustrated as a hardware component attached to the bus 1408, it is to be appreciated that in one example, the logic 1430 could be implemented in the processor 1402.

Generally describing an example configuration of the computer 1400, the processor 1402 may be a variety of various processors including dual microprocessor and other multiprocessor architectures. A memory 1404 may include volatile memory and/or non-volatile memory. Non-volatile memory may include, for example, ROM, PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A disk 1406 may be operably connected to the computer 1400 via, for example, an input/output interface (e.g., card, device) 1418 and an input/output port 1410. The disk 1406 may be, for example, a magnetic disk drive, a solid state disk drive, a floppy disk drive, a tape drive, a Zip drive, a flash memory card, and/or a memory stick. Furthermore, the disk 1406 may be a CD-ROM (compact disk ROM), a CD recordable drive (CD-R drive), a CD rewritable drive (CD-RW drive), and/or a digital video ROM drive (DVD ROM). The memory 1404 can store a process 1414 and/or a data 1416, for example. The disk 1406 and/or the memory 1404 can store an operating system that controls and allocates resources of the computer 1400.

The bus 1408 may be a single internal bus interconnect architecture and/or other bus or mesh architectures. While a single bus is illustrated, it is to be appreciated that the computer 1400 may communicate with various devices, logics, and peripherals using other busses (e.g., USB (universal serial bus), Ethernet). The bus 1408 can be types including, for example, a memory bus, a memory controller, a peripheral bus, an external bus, a crossbar switch, and/or a local bus.

The computer 1400 may interact with input/output devices via the i/o interfaces 1418 and the input/output ports 1410. Input/output devices may be, for example, a keyboard, a microphone, a pointing and selection device, cameras, video cards, displays, the disk 1406, the network devices 1420, and so on. The input/output ports 1410 may include, for example, serial ports, parallel ports, and USB ports.

The computer 1400 can operate in a network environment and thus may be connected to the network devices 1420 via the i/o interfaces 1418, and/or the i/o ports 1410. Through the network devices 1420, the computer 1400 may interact with a network. Through the network, the computer 1400 may be logically connected to remote computers. Networks with which the computer 1400 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing processor executable instructions that include a browser extension for operating with a web browser on a computing device, the browser extension comprising:
   a toolbar logic to provide a toolbar;
   a sidebar logic to provide a sidebar, wherein the toolbar and the sidebar provide functionality that is independent from the web browser, and wherein the toolbar and sidebar are part of the web browser and separate from a native toolbar of the web browser;
   a coordination logic to coordinate a presentation, functionality, and interoperability of a combination of the toolbar and the sidebar to be provided to the web browser, wherein the presentation, functionality, and interoperability are based, at least in part, on a selectable presentation mode and a selectable attachment mode; and
   logic to display a menu on the toolbar with a set of mode options for the selectable presentation mode and the selectable attachment mode, wherein the set of mode options include a dedicated window mode, a floating sidebar mode, an attached mode, a horizontal embedded sidebar and horizontal embedded toolbar mode, a vertical embedded sidebar and vertical embedded toolbar mode, a vertical toolbar mode, and a hidden mode, wherein selection of one of the embedded modes causes the combination of the toolbar and the sidebar to be established as graphical user interface elements that are part of the web browser, wherein selection of the attached mode causes the combination of the toolbar and the sidebar to be established as graphical user interface elements that can be connected to the web browser and managed separately from the web browser, and wherein selection of the floating sidebar mode causes the sidebar to be established as a graphical user interface element that can be managed separately from the web browser and that can be positioned separately from the web browser;

wherein the selectable attachment mode and the selectable presentation mode are identified in response to a user selection from the menu with the set of mode options, and wherein the user selection identifying a mode option from the set of mode options controls display of additional windows that are opened subsequent to the user selection.

2. The browser extension of claim 1, wherein the presentation mode determines a set of functionality that is to be provided by the browser and the browser extension, wherein the set of functionality includes functionality provided by one or more of, the browser, and the browser extension, and wherein functionality is invoked through one or more of, the toolbar, and the sidebar.

3. The browser extension of claim 2, wherein the presentation mode is one of a standard browser mode, a standard browser plus extension mode, and an extension mode.

4. The browser extension of claim 1, wherein the attachment mode controls the location of the toolbar, the location of the sidebar, and the independence of the combination of the toolbar and sidebar with respect to a browser window provided by the browser.

5. The browser extension of claim 4, wherein the vertical embedded sidebar and vertical embedded toolbar mode displays the toolbar and sidebar side-by-side vertically and aligned on a left side or right side of the browser.

6. The browser extension of claim 1, wherein the presentation mode and the attachment mode combine to form a hidden state wherein content associated with the sidebar is to be temporarily displayed when the sidebar is hidden when an element on the toolbar associated with the content is activated.

7. The browser extension of claim 1, the browser extension being incorporated into a browser.

8. A non-transitory computer-readable medium storing computer executable instructions that when executed by a computer cause the computer to perform a method, the method comprising:

receiving an identifier of a browser window provided by a browser with which a browser extension is to interact;

receiving a mode signal concerning a toolbar-sidebar combination to be provided to the browser window by the browser extension;

initializing a user interface toolbar to form part of the toolbar-sidebar combination and to be associated with the browser window, wherein the initializing is based, at least in part, on the mode signal;

initializing a user interface sidebar to form part of the toolbar-sidebar combination and to be associated with the browser window, wherein the initializing is based, at least in part, on the mode signal, wherein the toolbar and the sidebar provide functionality that is independent from the browser window, and wherein the toolbar and sidebar are part of the browser window and separate from a native toolbar of the browser window;

establishing a relationship between the user interface toolbar and the user interface sidebar to facilitate collectively managing the user interface toolbar and the user interface sidebar as the toolbar-sidebar combination;

selectively providing the toolbar-sidebar combination to the browser window associated with the identifier, wherein the location of the toolbar-sidebar combination with respect to the browser window is controlled, at least in part, by the mode signal, wherein the presence and functionality of native browser chrome associated with the browser window depends, at least in part, on the presence and functionality of the toolbar-sidebar combination, and wherein the mode signal provides for the identification of a type of mode for displaying the toolbar-sidebar combination, wherein the mode signal is provided in response to a user selection of a menu option from a menu that displays a set of mode options including a dedicated window mode, a floating sidebar mode, a horizontal embedded sidebar and horizontal embedded toolbar mode, a vertical embedded sidebar and vertical embedded toolbar mode, a vertical toolbar only mode, and a hidden mode, wherein the mode signal controls a type of mode for displaying additional browser windows that are opened subsequent to the user selection, wherein selection of the floating sidebar mode causes the user interface toolbar to be connected to the browser window and the user interface sidebar to not be connected to the browser window, wherein selection of one of the embedded modes causes the user interface toolbar to be incorporated into the browser window and the user interface sidebar to be incorporated into the browser window, and wherein selection of the hidden mode causes the user interface toolbar to be incorporated into the browser window.

9. The non-transitory computer-readable medium of claim 8, wherein the mode signal identifies that a dedicated window mode is to be created, and wherein the dedicated window mode includes the user interface toolbar being connected to the browser window, the user interface sidebar being connected to the browser window, displaying the custom chrome in the user interface toolbar, and the user interface sidebar.

10. The non-transitory computer-readable medium of claim 8, wherein the mode signal identifies that a floating sidebar mode is to be created, and wherein content displayed in the browser window is to be controlled, at least in part, by a user interaction with the user interface sidebar.

11. The non-transitory computer-readable medium of claim 8, wherein the mode signal identifies that a horizontal embedded sidebar and horizontal embedded toolbar mode is to be created, wherein the horizontal embedded sidebar and horizontal embedded toolbar mode includes the user interface toolbar being incorporated into the browser window and the user interface sidebar being incorporated into the browser window, wherein the user interface sidebar can be closed without affecting the user interface toolbar, and wherein the user interface toolbar is to be oriented horizontally with respect to the browser window.

12. The non-transitory computer-readable medium of claim 11, wherein the user interface sidebar is to be oriented vertically at a side of the browser window.

13. The non-transitory computer-readable medium of claim 8, wherein the mode signal identifies that a vertical embedded sidebar and vertical embedded toolbar mode is to be created, wherein the vertical embedded sidebar and vertical embedded toolbar mode includes the user interface toolbar being incorporated into the browser window and the user interface sidebar being incorporated into the browser window, wherein the user interface sidebar can be closed without affecting the user interface toolbar, and wherein the user interface toolbar is to be oriented vertically along a side of the browser window.

14. The non-transitory computer-readable medium of claim 13, wherein the user interface sidebar is to be oriented vertically along a side of the browser window.

15. The non-transitory computer-readable medium of claim 8, wherein the mode signal identifies that a toolbar only mode is to be created, wherein the toolbar only mode includes the user interface toolbar being incorporated into the browser window.

16. The non-transitory computer-readable medium of claim 8, wherein the mode signal identifies that a hidden mode is to be created, wherein a user interface toolbar element is related to a user interface sidebar content, and wherein the user interface sidebar content is to be temporarily displayed when the user interface toolbar element is selected.

17. The non-transitory computer-readable medium of claim 8, wherein initializing the user interface toolbar includes establishing one or more of, a location for the toolbar, a size for the toolbar, a set of functionality for the toolbar, and a subset of native browser toolbar functionality to be included in the set of functionality for the toolbar.

18. The non-transitory computer-readable medium of claim 8, wherein initializing the user interface sidebar includes establishing one or more of, a location for the sidebar, a size for the sidebar, a set of functionality for the sidebar, and a subset of native browser sidebar functionality to be included in the set of functionality for the sidebar.

19. The non-transitory computer-readable medium of claim 8, wherein the mode signal is provided by the browser window in response to a user selection of a mode, and wherein the user selection of a mode is made through one or more of, selection of a menu item from a menu associated with the browser window, selection of a bookmark item from a graphical user interface element associated with the browser window, selection of an item from a graphical user interface element associated with the browser window, and data entry into an options panel provided by the browser window.

20. The non-transitory computer-readable medium of claim 8, wherein the mode signal is evaluated in the context of a hidden state signal to control whether the toolbar-sidebar combination is to be displayed.

21. The non-transitory computer-readable medium claim 8, including selectively controlling a browser to instantiate a subsequent browser window in accordance with the mode signal.

22. A non-transitory computer-readable medium storing computer executable instructions that when executed by a computer cause the computer to perform a method, the method comprising:

displaying a polymorphic toolbar sidebar combination in a browser window based, at least in part, on a mode signal provided by a browser extension,
wherein the mode signal controls the identification of a mode for displaying the polymorphic toolbar sidebar combination, and
wherein the polymorphic toolbar sidebar combination includes a user interface sidebar that includes at least two window panes and a user interface main toolbar with at least one icon for each window pane in the user interface sidebar, wherein the user interface sidebar and the user interface main toolbar provide functionality that is independent from the browser window, and wherein the user interface sidebar and the user interface main toolbar are part of the browser window and separate from a native toolbar of the browser window; and
changing the mode for displaying the polymorphic toolbar sidebar combination in response to a user input to the browser extension, wherein the user input is received from a selection of a menu option from a menu that displays a set of options and generates the mode signal, wherein the set of options includes a dedicated window mode, a floating sidebar mode, an attached mode, a horizontal embedded sidebar and horizontal embedded toolbar mode, a vertical embedded sidebar and a vertical embedded toolbar mode, a vertical toolbar only mode, and a hidden mode, wherein the mode signal controls a mode for displaying additional browser windows that are opened subsequent to the user input, wherein selection of one of the embedded modes causes the polymorphic toolbar sidebar combination to be established as graphical user interface elements that are part of the browser window, wherein selection of the attached mode causes the polymorphic toolbar sidebar combination to be established as graphical user interface elements that can be connected to the browser window and managed separately from the browser window, and wherein selection of the floating mode causes the polymorphic toolbar sidebar combination to be established as graphical user interface elements that can be managed separately from the browser window and that can be positioned separately from the browser window.

23. The non-transitory computer-readable medium of claim 22, comprising: hiding a native browser chrome of the browser window by displaying custom browser chrome associated with the polymorphic toolbar sidebar combination.

24. The non-transitory computer-readable medium of claim 22, comprising: determining a last known presentation mode for the polymorphic toolbar sidebar combination in response to initiating a new browser window, wherein the browser extension controls the new browser window to display the polymorphic toolbar sidebar combination by using the last known presentation mode, and wherein the last known presentation mode is the mode for displaying the polymorphic toolbar sidebar combination.

* * * * *

UNITED STATES PATENT AND TRADEMARK OFFICE
CERTIFICATE OF CORRECTION

PATENT NO.         : 8,255,824 B2
APPLICATION NO.    : 11/978921
DATED              : August 28, 2012
INVENTOR(S)        : Selig Page 1 of 1

It is certified that error appears in the above-identified patent and that said Letters Patent is hereby corrected as shown below:

On title page, in column 1, under "U.S. Patent Documents", line 2, delete "Pasquall" and insert -- Pasquali --, therefor.

On title page, in column 1, under "U.S. Patent Documents", line 3, delete "Pasquall" and insert -- Pasquali --, therefor.

On title page, in column 1, under "U.S. Patent Documents", line 6, delete "Pasquall" and insert -- Pasquali --, therefor.

On title page, in column 1, under "U.S. Patent Documents", line 7, delete "Pasquall" and insert -- Pasquali --, therefor.

On sheet 9 of 16, in figure 9, Reference Numeral 930, line 1, delete "Toolber" and insert -- Toolbar --, therefor.

In column 4, line 39, delete "servelet," and insert -- servlet, --, therefor.

In column 13, line 50, delete "direct RAM bus RAM (DRRAM)" and insert -- direct Rambus DRAM (DRDRAM) --, therefor.

In column 17, line 50, in Claim 21, after "medium" insert -- of --.

Signed and Sealed this
Eighth Day of January, 2013

David J. Kappos
*Director of the United States Patent and Trademark Office*